United States Patent [19]

Johnson

[11] Patent Number: 4,964,103

[45] Date of Patent: Oct. 16, 1990

[54] THREE DIMENSIONAL BEFORE STACK DEPTH MIGRATION OF TWO DIMENSIONAL OR THREE DIMENSIONAL SEISMIC DATA

[75] Inventor: James H. Johnson, Houston, Tex.

[73] Assignee: Conoco Inc., Ponac City, Okla.

[21] Appl. No.: 380,228

[22] Filed: Jul. 13, 1989

[51] Int. Cl.$^5$ .............................................. G01V 1/36
[52] U.S. Cl. ...................................... 367/53; 367/50; 367/73
[58] Field of Search ....................... 367/50, 51, 52, 53, 367/73; 364/421

[56] References Cited

U.S. PATENT DOCUMENTS

| | | | |
|---|---|---|---|
| H482 | 6/1988 | Berryhill et al. | 367/38 |
| 3,671,929 | 6/1972 | Ruehle et al. | 367/68 |
| 4,415,999 | 11/1983 | Moeckel et al. | 367/73 |
| 4,464,737 | 8/1984 | Pann | 367/49 |
| 4,479,205 | 10/1984 | Gray | 367/63 |
| 4,736,347 | 4/1988 | Goldberg et al. | 367/46 |
| 4,742,497 | 5/1988 | Beasley et al. | 367/52 |
| 4,745,585 | 5/1988 | Larner | 367/50 |
| 4,766,574 | 8/1988 | Whitmore | 367/50 |

OTHER PUBLICATIONS

"Trends in Seismic Data Processing," French, W. S., *Geophysics, Leading Edge*, Sep. 1986, pp. 38-45.

*Primary Examiner*—Ian J. Lobo

[57] ABSTRACT

The present invention provides a three dimensional before stack depth migration of two dimensional or three dimensional seismic data. Ray tracing is used to move before stack trace segments to their approximate three dimensional position. The trace segments are scaled to depth, binned, stacked and compared to the model. The model can then be changed to match the depth trace segments which will be stacked better, moved closer to their correct three dimensional position and will compare better to the model.

17 Claims, 6 Drawing Sheets

THREE DIMENSIONAL BEFORE STACK DEPTH MIGRATION OF TWO DIMENSIONAL OR THREE DIMENSIONAL SEISMIC DATA

BACKGROUND OF THE INVENTION

1. FIELD OF THE INVENTION

The present invention relates to a method for improving the quality of seismic data and more particularly to depth migrating data before stacking to improve the quality of seismic data acquired in the presence of complex structures or any laterally changing velocity.

2. RELATED PRIOR ART

Presently, prestack traces are usually aligned assuming three characteristics. First, the common depth point (CDP) is halfway between the source and receiver. Second, all seismic reflectors are in the plane of the section. Third, all traces within an area designated as a common depth point can be corrected to zero offset by using the same velocity function.

There are many methods in the prior art for aligning seismic data. For example, U.S. Pat. Nos. 4,766,574 and 4,742,497 illustrate the alignment of seismic data migrated before stack.

U.S. Pat. No. 4,766,574 titled "Method for Depth Imaging Multicomponent Seismic Data", (Norman D. Whitmore, Jr., et al.), relates to a method of migrating time dependent reflectivity functions prior to stacking to obtain depth images of the earth's subsurface geological structure as well as estimates of shear and compressional wave interval velocities. Measures are obtained of generated seismic wavefields incident on reflecting interfaces or subsurface layer boundaries in the earth's crust. Measures are also obtained of resulting seismic wavefields scattered from these interfaces. The incident and scattered seismic wavefields are employed to produce time-dependent reflectivity functions representative of the reflecting interfaces. By migrating these time-dependent reflectivity functions, depth images of the reflecting interfaces can be obtained. For pairs of multicomponent seismic data, the dyadic set of multicomponent seismic data are partitioned so as to separate the variously coupled incident and reflected wavefields in the recorded multicomponent seismic data. The incident and reflected wavefields are cross-correlated to form time-dependent reflectivity functions. These time-dependent reflectivity functions are then iteratively migrated according to a model of wavefield velocities of propagation to obtain better estimates of the compressional and shear wave interval velocity. The migrated reflectivity functions can then be stacked to produce better depth images of the earth's subsurface geological structures.

U.S. Pat. No. 4,742,497 titled "Method of Processing Seismic Data", (Craig Beasley. et al.), relates to a method for converting a set of areal-distributed seismic traces without dependence on subsurface structure orientation dependent velocities. A three-dimensional display of a volume of the earth without use of dip-dependent or azimuth-dependent migration velocities.

Once data is aligned, various other methods may be used for migration. U.S. Pat. Nos. 4,745,585, 4,479,205 and 4,464,737 along with United States Statutory Registration number H482 illustrate methods of migrating seismic data.

U.S. Pat. No. 4,745,585, "Method of Migrating Seismic Data" (Kenneth L. Larner), relates to seismic data which is passed through a preselected number of migration stages. During each stage, data is migrated a plurality of times, where the migration-velocity function is a minor fraction of the velocity required to fully migrate the data in a single stage. The cascaded migration migrates data having steeply-dipping events with what is alleged to be greater noise reduction than does a single-stage migration.

U.S. Pat. No. 4,479,205 titled "Method of Migrating Seismic Data without Dependency on Velocity", (William C. Gray), relates to a method for migration of velocity spectra wherein migration of common depth point gathers is accomplished without prior determination of the velocity/depth field. By using the method presented, in which the velocity spectra of the data is transposed, fast Fourier transformed and then migrated, migration of the data is accomplished without prior determination of velocity.

U.S. Pat. No. 4,464,737 titled "Method for Migration of Seismic Reflection Waves", (Keh Pann) relates to seismic exploration wherein a seismic source transmits seismic energy into the earth and seismic detectors record the seismic waves returning to the earth's surface from reflecting subsurface interfaces. The downgoing transmitted seismic energy and the upcoming reflected seismic waves are transformed into the frequency domain, downward continued, and summed to produce a migrated seismic depth section.

United States Statutory Invention registration number H482, titled "Seismic Migration Method", (John R. Berryhill, et al.), relates to a seismic data processing method in which seismic traces are subjected to Fourier transformations, the coefficients of the Fourier-Transformed traces are subjected to a recursive KF migration operation and the migrated traces are then inverse Fourier-transformed. Each trace contains a signal resulting from reflection of a seismic wave at a location within the earth. Each trace is associated with at least one point in a two dimensional spatial grid (x,y). When displayed, the processed seismic data represents the position within the earth of whatever caused the reflection. The method may be employed to process stacked seismic traces, each associated with a single point (x,y) in the grid, or may be employed to process unstacked seismic traces, each associated with both a seismic source location $(x_s,y_s)$ and a different seismic receiver location $(x_r,y_r)$ in the grid. In performing the method, the earth is modeled as a stack of M horizontal layers each characterized by a seismic wave velocity. The recursive KF migration step is iterated $M-1$ times for each trace, where part of the output of each iteration is stored and part is discarded.

SUMMARY OF THE INVENTION

The present invention provides an improvement in seismic depth modeling. None of the three prior art assumptions normally made for aligning prestack traces are required for the present invention, that is, the common depth point is not assumed to be midway between the source and receiver, all seismic reflectors are not assumed to be in the plane of the section and all traces within a common depth point are not assumed to be correctable to zero offset using the same velocity function. A three dimensional depth model of the type currently produced including, for example, depth maps along with an internal velocity map for the zone above each horizon, and field seismic data, with expansion and deconvolution applied to the data before normal move out and stacking, is used. A trace is read to obtain the three dimensional source and receiver position. A three dimensional raypath is derived that travels from the source, through the model down to a primary objective map, for example, the deepest map, and up to the receiver. The travel time and the position of the reflection point are noted. A predetermined time duration centered on the travel time is assigned to the reflection point position. Other rays that travel from the source, to the primary objective map and then to the receiver also receive a similar assignment. The next trace is read in and similar assignments are made. This pattern is continued until all traces have been processed. Data is binned in (x,y) bins. Traces within these bins are stacked. The stacked depth trace segments have an improved signal to noise ratio.

DESCRIPTION OF THE PREFERRED EMBODIMENT

The three dimensional iterative structural modeling technique enables an interpreter to build a geologic model in depth that is compatible with the seismic data over the modeled area. Three-dimensional models are necessary when seismic data is acquired oblique to structural trends, especially when sideswipe is a likely problem. Modeling can also help describe the subsurface in areas of limited seismic or well data.

Figure 1:
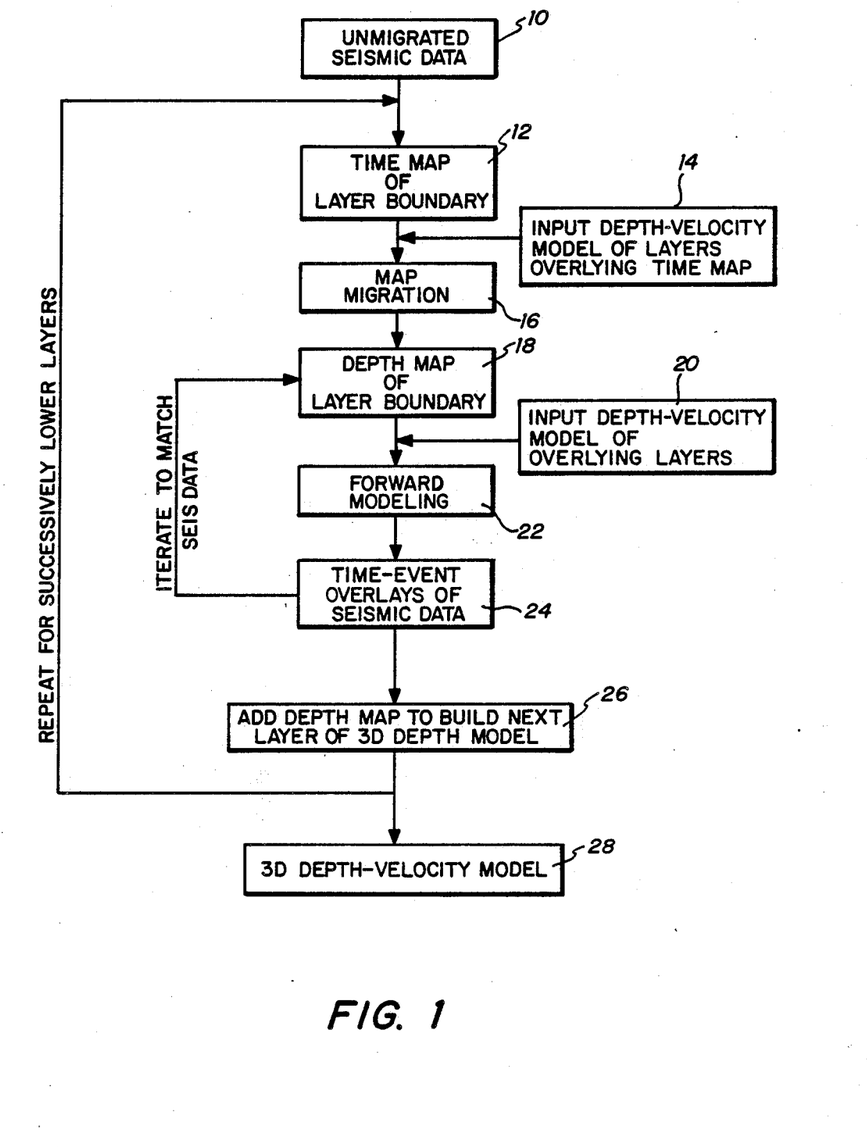
FIG. 1 is a flow chart of an iterative structural modeling technique.

Three dimensional iterative structural modeling combines both map migration and forward modeling. A layered approach is taken in which a depth model is built layer by layer from the surface downward. FIG. 1 illustrates that three basic steps are taken to derive the depth map of a layer. First, a time map (or maps for nonplane boundaries which produce multiple time events, e.g., synclines) for a layer surface using unmigrated seismic data is constructed. Second, the time map is migrated and a depth map is constructed. Third, the depth map is forward modeled for comparison with the original seismic data and refinement of the depth map. These steps are repeated for each layer needed to completely describe the three dimensional depth-velocity model.

Figure 2:
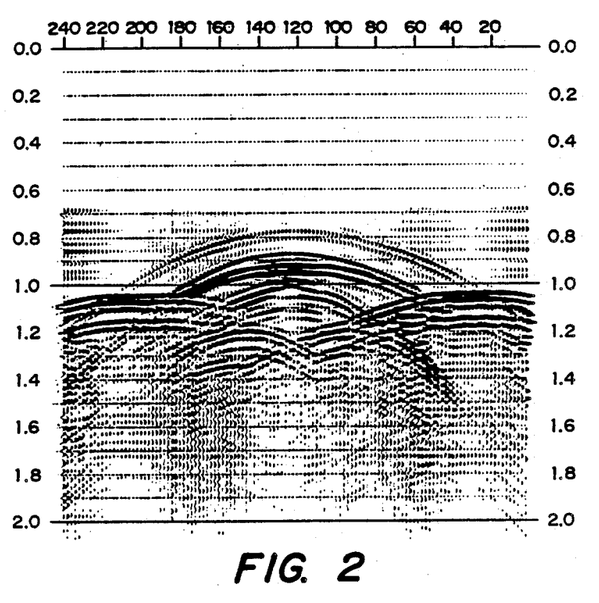
FIG. 2 is an unmigrated seismic section of a seismic line.
Figure 3:
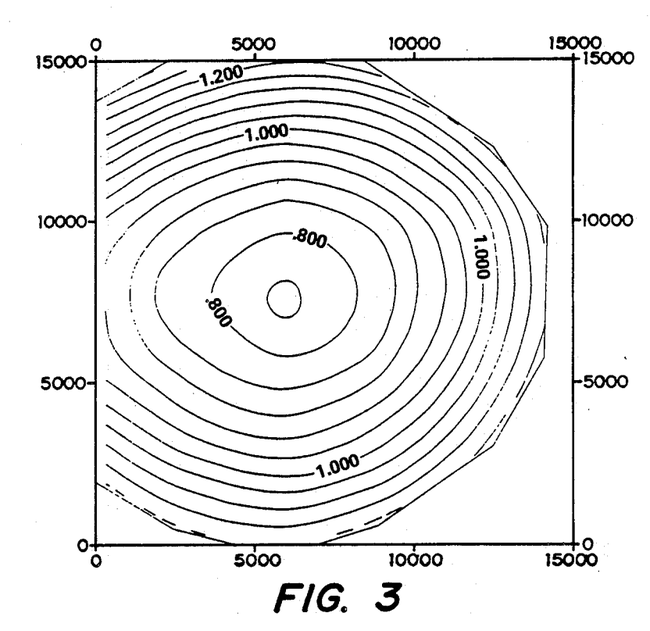
FIG. 3 is a time map of the first event constructed from unmigrated seismic data.
Figure 4:
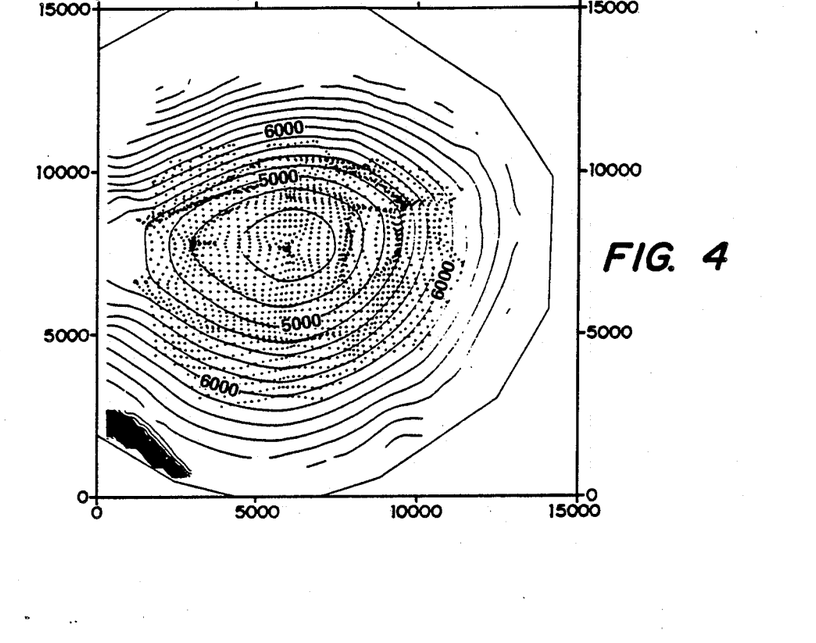
FIG. 4 is a depth map produced by contouring map migrated control points.

Referring now to FIG. 1, a flow chart of the steps for deriving a three dimensional depth velocity model is illustrated. At step 10 unmigrated seismic data is received. FIG. 2 is an illustration of one line of an unmigrated seismic section. The unmigrated seismic section of FIG. 2 shows an apparent dome like structure which appears to obscure deeper features. This data is used to provide a time map of a layer boundary at step 12. FIG. 3 is a time map similar to that produced in this step. Only one boundary layer is illustrated, showing the travel times from each constant time contour. This time map of a boundary layer is made by combining a plurality of unmigrated seismic sections as illustrated in FIG. 2. The boundaries are selected from each seismic section. The boundaries are correlated with areas between lines being interpolated. Depth-velocity models of the layers overlaying the time map are introduced at step 14. The time map is migrated into depth sections at step 16. A depth map of this layer boundary is then produced at step 18. FIG. 4 is an illustration of a depth map resulting from contouring map migrated control points which are illustrated as dots on the map. The contour lines shown outside the area defined by the control points are merely extrapolations and have no data substantiation. At 20, depth maps and their associated velocity maps of the layers above the layer boundary are inserted. These are the depth-velocity maps which could be obtained using map migration or the present invention. At step 22, the depth map of the layer boundary is forward modeled in conjunction with the depth-velocity model. Forward modeling is the inverse of map migration and involves the same procedures. The contoured depth map provides the control points for the forward modeling program. These control points are input by digitizing the depth map contours and using the mapping system to interpolate gridded control values. The grid points are used to calculate the slope of the depth map around each grid point. Rays normal to the map at each grid point are projected toward the surface. The rays are refracted at overlying boundaries using Snell's Law. The emergence position of the rays at the surface is stored along with the two-way travel time. The calculated time values represent the time event response of the depth map for a zero-offset source receiver arrangement. The time event values along a line corresponding to the location of one of the original seismic sections are interpolated from nearby calculated values and displayed in cross section. This time plot is overlain on the unmigrated seismic data and compared. The depth map is refined and forward modeling is repeated until the calculated values are compatible with each of the seismic sections.

Figure 5:
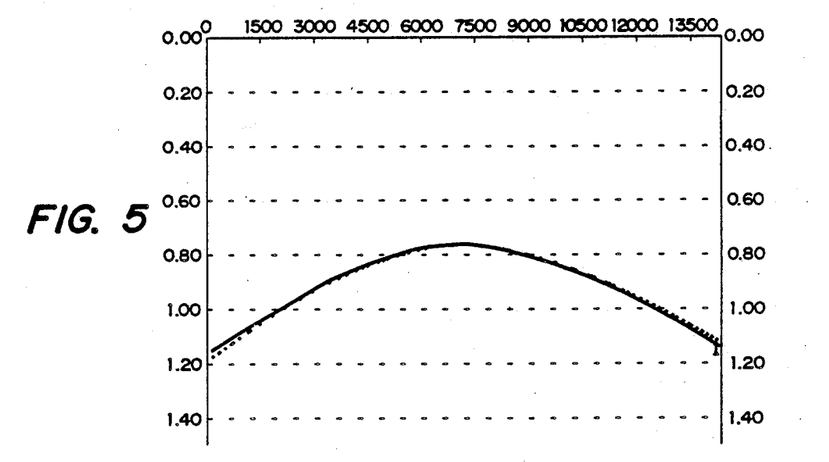
FIG. 5 is a comparison of calculated time event values with the picked events from the seismic sections of FIG. 2.

At step 24, time-event overlays of the seismic data are produced. FIG. 5 illustrates the comparison of calculated time events with the received seismic data. The small crosses represent the calculated time event values at various points. The solid line represents the selected event or layer boundary from the seismic sections illustrated in FIG. 2. The process encompassed by steps 18 to 24 is repeated to match the seismic data received initially. Once this is accomplished, the depth map is added to build the next layer of a three dimensional depth model at 26. This entire process is repeated until all of the depth maps of layer boundaries are obtained, producing a three dimensional depth-velocity model at step 28.

Three dimensional iterative structural modeling is a process that converts a depth model to unmigrated time and allows the user to compare this to the real seismic data. The following process converts the seismic data to depth and then allows the user to compare this depth data to the depth model.

Figure 6:
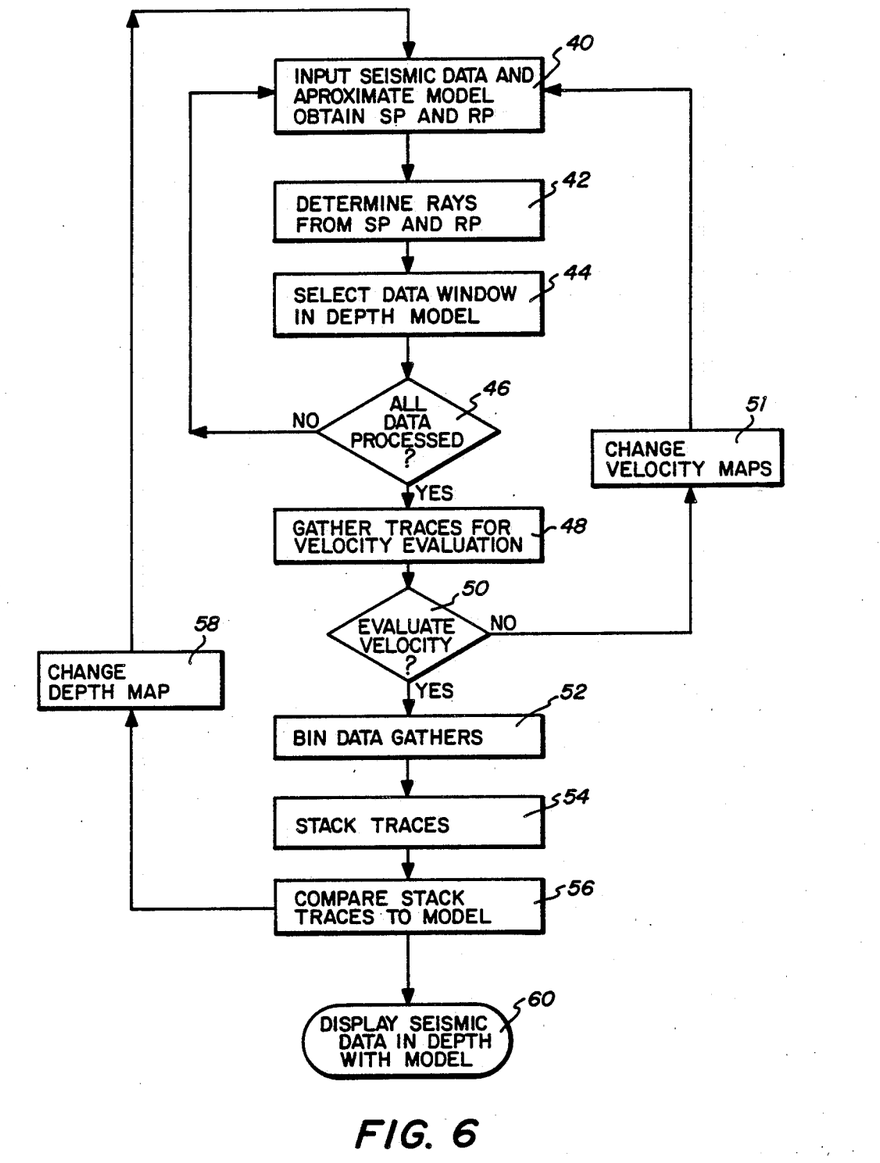
FIG. 6 is a flow chart of a process for pre-stack migration of seismic data.

Referring now to FIG. 6, the method of the present invention is illustrated in greater detail as a flow chart.

Initially, a three dimensional Depth Model similar to that obtained using the techniques of FIG. 1 is provided at step 40. This model, for example, may include several depth maps and the interval velocity map for the zone above each horizon. Also provided at step 40 is seismic data, that is, field data with expansion and deconvolution applied to the data but before normal moveout (NMO) and stacking. The three dimensional source and receiver position is obtained. The three dimensional raypath that travels from the source through the model down to the primary objective map, that is, for example, a point on the deepest map, and up to the receiver is derived at step 42 (see FIG. 6).

Figure 8:
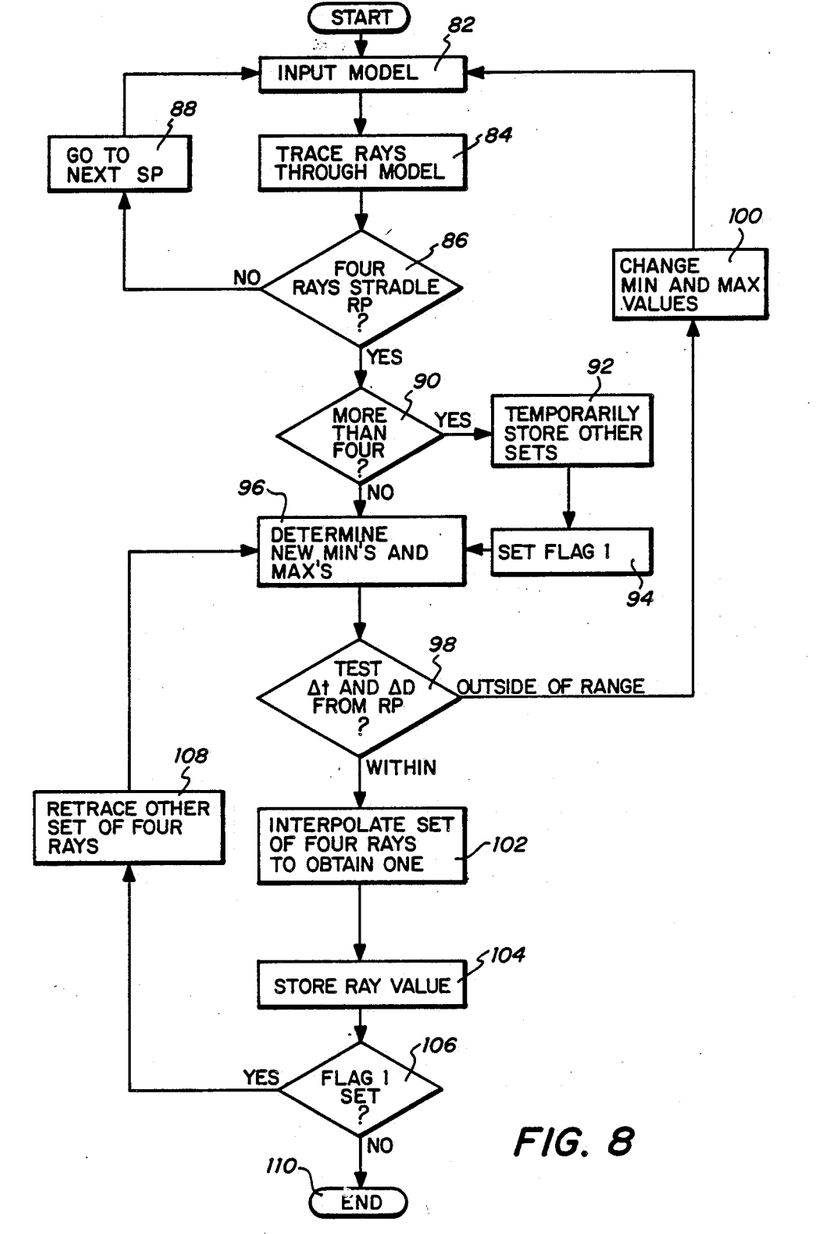
FIG. 8 is a flow chart of a process for tracing rays from one surface point, reflected from a depth map and to a second surface point.

Details of step 42 are illustrated in the flow chart of FIG. 8. The ray starts at the source and obeys Snell's Law as it travels through the different layers (boundaries or depth maps). At the reflecting boundary the raypath derived obeys the physical law that the angle of reflection is equal to the angle of incidence. It then travels toward the receiver position again obeying Snell's Law. Because the ray is constrained only by these two laws, the reflection point is not assumed to be in the vertical plane of the section nor is it assumed to be midway between the source and receiver.

The method for obtaining this ray is to start many rays from the source. Each ray is separated from its neighbor by a uniform predetermined angle, for example, five degrees in the north-south and east-west directions. The minimum angle in the north-south and east-west directions is zero degrees while the maximum angle is one hundred eighty degrees.

Usually, there will be one or more sets of four rays that straddle the receiver position in both the north-south and east-west directions. In the preferred embodiment, the term straddle is used to mean that two rays, reflected from the depth map, that are adjacent at the source position, arrive at the surface on either side of the receiver position in the north-south direction. Similarly, two reflected rays that are adjacent at the source position and adjacent to the north-south rays arrive at the surface on either side of the receiver position in the east-west direction. Thus, four adjacent rays, two in the north-south direction and two in the east-west direction, straddle the receiver position. The immergence angles of the four rays will be the new north-south minimum and maximum and the new east-west minimum and maximum. Additional rays from the source may be started using these minimums and maximums and a smaller angle between the rays. Again four rays will usually straddle the receiver position and new minimums and maximums can be obtained. This method may be iterated until the travel time of the four rays straddling the receiver position is less than, for example, four thousandths of a second and all rays reach the surface within a predetermined distance, such as fifty feet of the receiver position. An interpolation of the last four rays produces the final ray.

In the method of the present invention, two dimensional seismic data may be used. Prestack data is collected in a manner similar to the way data is binned using conventional methods. However, in the method of the present invention, data is collected according to reflection points while data is binned in conventional methods using common midpoint or common depth point analysis By the analysis used in the present invention, the reflection point is not assumed to be midway between the source and receiver, but may be anywhere, its travel path determined by Snell's Law. Further, this raypath is not assumed to be in the same vertical plane as the seismic line since it may occur anywhere in three dimensional space.

Next, the travel time, tt, and the (x,y,z) position of the reflection point are noted. A portion of the trace centered on time tt, such as four hundred milli-seconds, is assigned to this (x,y,z) position. Other rays that go from the source to the primary objective map to the receiver are given the same "trace portion—(x,y,z)" assignment at step 44. The next trace is then read in, and its "trace portion—(x,y,z)" assignments are made. At step 46 a determination as to whether all traces have been read. If they have not been read, steps 40–44 are repeated. This process is continued until all traces have been processed in this manner.

A reflection point map is analyzed at step 48 to determine where the density of reflection points is the largest and to gather the traces from this area. The interval velocities are evaluated at step 50 by checking the alignment of events. The events align or the events are flat when a correct model has been used. If the events do not align, the interval velocities which were used are changed at step 51 and the process is returned to step 40. This alignment of events is similar to the conventional normal moveout (NMO) corrections. However, in the present invention, each ray encounters a different velocity distribution, so each trace segment receives its own independent velocity correction. Conventional NMO removal assumes all traces reflected at a common depth point need the same stacking velocity function to align them. The data is binned in (x,y) bins at step 52 and the traces within these bins are stacked at step 54. If the correct model was used, these stacked trace segments have a better signal to noise (S/N) ratio than conventional processing produces. The stacked traces are compared to the model at step 56. If an incorrect model results, the depth map is changed and the process is reiterated or repeated at 58.

To verify the accuracy of the depth maps, a seiscrop map along the depth map of interest is developed. When the model is correct, this map should be all black where there were reflection points (a peak was the event mapped) or all white (a trough was mapped). The areas of this map that alternate between black and white are the areas where the depth map is incorrect. Through these areas vertical cross-sections can be displayed.

Figure 7:
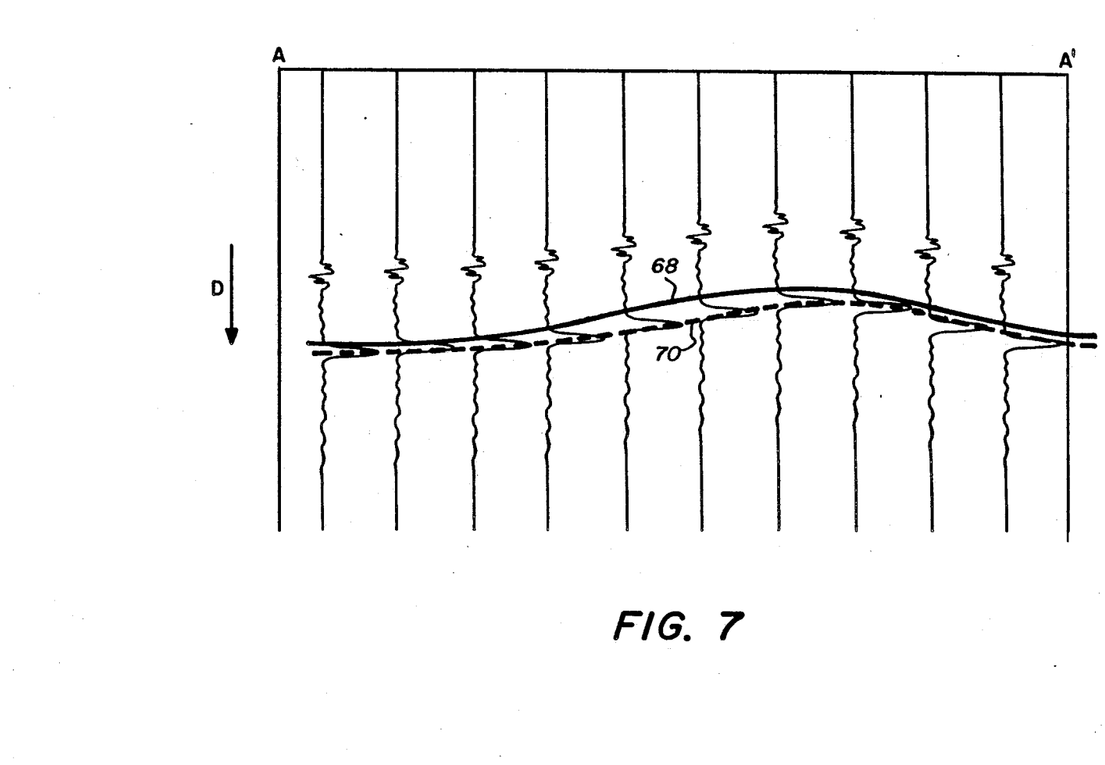
FIG. 7 is a comparison of depth trace segments with control points.

Referring now to FIG. 7, the displayed stacked trace segments scaled to Depth using the interval velocity above the primary objective map are illustrated. A line 68 is placed to show the cross-section of the model. Correlated and interpreted depth trace segments illustrated by dotted line 70 is identified to indicate where the model should have been located if everything had been done perfectly the first attempt. The map is changed to agree with these new control points. In this manner the model is changed to match the seismic data. This new model could be the starting point of another iteration of the present method but if the changes were minor, the model can be used to move only the stacked trace segments. Then, again, a seiscrop along the map may be displayed along with vertical sections where needed and change the depth map may be changed where needed. By iterating this method, a map that is in very close agreement with the depth corrected seismic segments is obtained.

Referring now to FIG. 8, a flow chart of the method for ray tracing utilized in step 42 of FIG. 6 is illustrated. The method begins at block 80, labeled "start". At block 82 a model is input along with additional information, such as the north-south minimum and maximum, the east-west minimum and maximum, the increment angle, the source position (SP) and the receiver position (RP). At step 84, rays are traced through the model. At step 86, the rays which were traced through the model are evaluated. For each receiver position, the rays are evaluated to determine if four rays straddle that particular receiver position. If four rays do not straddle the receiver position, the method proceeds to block 88 which moves the program to the next source and receiver position. The program then proceeds to block 82 where the model data is called up and the program begins with a new receiver and/or source and receiver position. If at least four rays straddle the receiver position, the program proceeds to block 90 which is an additional decision block. At this point, it is determined whether more than four rays straddle the receiver position. If more than four straddle the receiver position, the program proceeds to block 92 where a set of four rays is selected and other sets are temporarily stored. From block 92 the program moves to block 94 where "Flag 1" is set and then moves to block 96. If only four rays straddle the receiver position, the program moves from decision block 90 to block 96 where new minimums and maximums are determined. The program the proceeds to decision block 98 where the travel time and distance from the receiver position are compared. If the $\Delta t$ and $\Delta d$ from the travel time and distance from the receiver position are outside a predetermined range, the program moves to block 100 where the minimum and maximum values are changed to those determined in block 96 and proceeds to block 82 where the program is repeated with narrower minimum and maximum values. If $\Delta t$ and $\Delta d$ are within a predetermined range, the program moves to block 102 where the set of four rays are interpolated to obtain a single ray. The value of this single ray is stored at block 104 and the program moves to decision block 106. At decision block 106, whether "Flag 1" has been set is determined. If "Flag 1" has been set, the program moves to block 108 where another set of four rays is recalled and the program proceeds back to block 96. If "Flag 1" had not been set, that is, only four rays straddle the receiver position, the program proceeds to block 110 where this portion of the program is finished. That is, rays have been determined that travel from a source position, to a depth map and then to a receiver position, illustrating the process of block 42 in FIG. 6.

Although this method has been described for a deep horizon, clearly, the shallow maps and velocities must be close to correct before the deeper events can be expected to come into focus. The present invention needs to be used on the shallow events first if there is any question about their velocities or depth maps.

The present invention has been described by way of a preferred embodiment for illustration purposes only. It is to be understood that the present invention is not limited thereto, but only by the scope of the following claims.

What is claimed is:

1. A method to provide a three dimensional before stack depth migration of seismic data comprising the steps of:
  receiving seismic data as seismic traces;
  receiving an approximate depth mode;
  determining approximate locations for predetermined segments of said seismic traces;
  moving said predetermined segments to said approximate locations;
  scaling said predetermined segments to depth by obtaining three dimensional source and receiver positions on each trace and deriving a three dimensional raypath from the source to a primary objective map and to the receiver by locating raypaths having emergence points within a predetermined area around said receiver position;
  binning said scaled predetermined segments according to reflection point location;
  stacking said scaled predetermined segments contained in each bin;
  comparing said stacked scaled segments to said three dimensional model; and
  modifying said three dimensional model to conform to said stacked scaled segments.

2. The method according to claim 1 wherein said scaling step includes the steps of:
  shooting a plurality of rays from said source position to said primary objective map and to a surface upon which said receiver position is located;
  selecting a set of rays from said plurality of rays which straddle said receiver position by less than a predetermined amount; and
  determining a compromise reflection point from reflection points identified by said selected set of rays.

3. The method according to claim 2 wherein said binning step includes the steps of:
  noting the travel time of said raypath and the position of the reflection point on the primary objective map; and
  assigning a portion of the trace centered on said travel time to said reflection point position.

4. The method according to claim 3 wherein said binning step also includes the step of:
  assigning another portion of the trace centered on a travel time as derived by a second ray to its reflection point position on the primary objective map whenever said second ray exits.

5. The method according to claim 2 wherein said selecting a set of rays includes the steps of:
  selecting four rays in a first line straddling said receiver position, two rays on either side of said receiver position; and
  selecting four rays in a second line perpendicular to said first line straddling said receiver position, two on either side of said receiver position.

6. A method for migrating seismic data comprising the steps of:
  obtaining a seismic model including a depth map and seismic data including seismic traces;
  gathering said seismic traces at a dense reflection point area by obtaining three dimensional source and receiver positions for each trace and deriving a three dimensional raypath from the source to a primary objective map and to the receiver by locating raypaths having emergence points within a predetermined area around said receiver position;
  evaluating the velocity of said gathered seismic traces by noting their alignment;
  binning data from said gathered seismic traces within a predetermined area of said dense reflection point area;
  stacking said binned data;
  comparing said stacked binned data with said seismic model; and changing the depth map whenever said stacked binned data differs from said seismic model by a predetermined amount.

7. The method according to claim 6 wherein said binning step includes the step of:
setting an area on a layer boundary as said predetermined area.

8. The method according to claim 6 wherein said comparing step includes the step of:
overlaying said stacked binned data on said seismic model.

9. The method according to claim 6 wherein said gathering step includes the steps of:
shooting a plurality of rays from said source position to said primary objective map and to a surface upon which said receiver position is located;
selecting a set of rays from said plurality of rays which straddle said receiver position by less than a predetermined amount; and
determining a compromise reflection point from reflection points identified by said selected set of rays.

10. The method according to claim 9 wherein said binning step includes the steps of:
noting the travel time of said raypath and the position of the reflection point on the primary objective map; and
assigning a portion of the trace centered on said travel time to said reflection point position.

11. The method according to claim 10 wherein said binning step also includes the step of:
assigning another portion of the trace centered on a travel time as derived by a second ray to its reflection point position on the primary objective map whenever said second ray exists.

12. The method according to claim 10 wherein said binning step also includes the step of:
assigning said reflection point position to said predetermined area on said layer boundary.

13. The method according to claim 9 wherein said selecting a set of rays step includes the steps of:
selecting four rays in a first line straddling said receiver position, two rays on either side of said receiver position; and
selecting four rays in a second line perpendicular to said first line straddling said receiver position, two on either side of said receiver position.

14. A method for tracing rays from a source position to a receiver position comprising the steps of:
receiving input data including a seismic model, north-south minimum and maximum values, east-west minimum and maximum values, an angle increment value, a source position and a receiver position;
obtaining a plurality of paths for rays traveling from said source position, through said seismic model, to a depth map and to a location near said receiver position;
selecting four paths from said plurality of paths that straddle said receiver position;
determining new north-south and east-west minimum and maximum values from said four paths;
changing said minimum and maximum values whenever said location deviates from said receiver position by a predetermined amount; and
interpolating said four ray paths to obtain a single ray path representing a path traveled from said source, through said model, to said depth map and to said receiver position.

15. The method according to claim 14 wherein said selecting step includes the step of:
storing additional paths that straddle said receiver position.

16. The method according to claim 15 also including the steps of:
selecting an additional four paths from said plurality of paths that straddle said receiver position;
determining new north-south and east-west minimum and maximum values from said additional four paths;
changing said minimum and maximum values whenever said location deviates from said receiver position by a predetermined amount; and
interpolating said additional four ray paths to obtain an additional ray path representing a second path traveled from said source position, through said model and to said receiver position.

17. The method according to claim 14 wherein said selecting step includes the step of:
selecting a second source position whenever said plurality of paths is less than four.

* * * * *